UNITED STATES PATENT OFFICE.

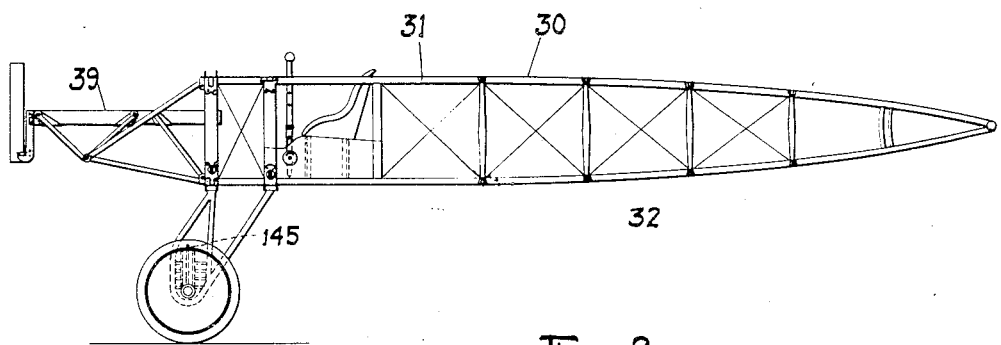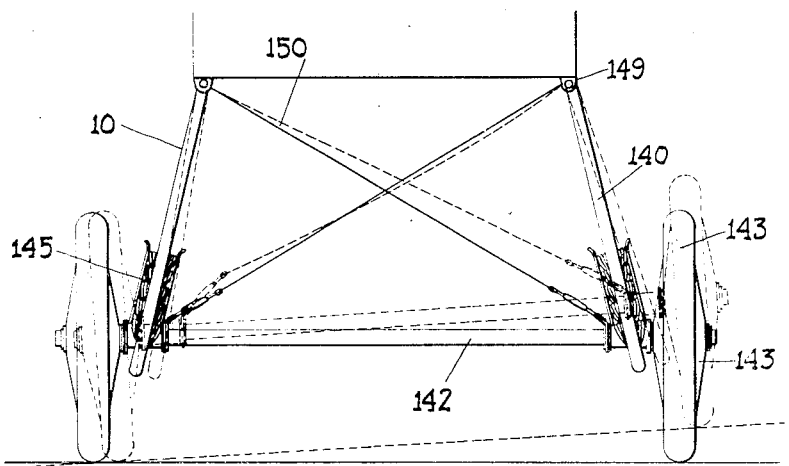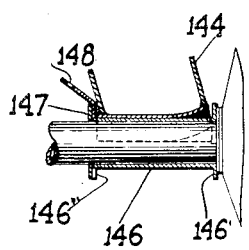

HENRY KLECKLER, OF HEMPSTEAD, NEW YORK, ASSIGNOR TO CURTISS AEROPLANE AND MOTOR CORPORATION, A CORPORATION OF NEW YORK.

AIRPLANE LANDING-GEAR.

1,370,693.  Specification of Letters Patent.  Patented Mar. 8, 1921.

Original application filed February 8, 1917, Serial No. 147,414. Divided and this application filed May 31, 1918. Serial No. 237,435.

*To all whom it may concern:*

Be it known that I, HENRY KLECKLER, a citizen of the United States, residing at Hempstead, in the county of Nassau and State of New York, have invented certain new and useful Improvements in Airplane Landing-Gears, of which the following is a specification.

My invention relates to airplane landing gears and is a division of application Serial #147,414, filed Feb. 8, 1917.

The object of the invention is to so construct the landing gear that both vertical and lateral shocks are directly absorbed by vertical and lateral yielding displacement of the landing gear axle. In gaining this end every consideration has been given the problem of adequately absorbing the laterally directed shocks without increasing the number of landing gear parts or increasing the flight resistant surface. The construction of the landing gear, considered in its entirety, is more or less conventional in that only a minimum number of parts are used. Instead of rigidly fastening the landing gear struts to the fuselage or body of the craft they are pivotally connected and extra heavy brace wires used in lieu of the ordinary comparatively light wiring. These extra heavy wires limit the lateral displacement of the landing gear struts, and in fact the landing gear as a whole, while the shock absorber elastics limit the vertical displacement of the axle. Consequently, by simply pivoting the struts and increasing the strength of the wiring the utility of the landing gear is increased two-fold without proportionately increasing the flight resistant surface. Moreover, if desired, the sturdy and conventional V-arrangement of the struts can be retained.

Of the drawings:

Figure 1 is a side elevation of the fuselage or body of an airplane equipped with a landing gear constructed as herein disclosed;

Fig. 2 is a front elevation of the landing gear, the dotted lines indicating the displacement of the landing gear parts arising through side swipe incident to landing; and Fig. 3 is a fragmentary sectional view illustrating the connection between the landing gear axle and cross tree of the shock absorber.

The landing gear designated as an entirety by the numeral 10 is mounted preferably substantially beneath the center of gravity of the machine. It is attached directly to the fuselage or body of the craft and is designed to facilitate ground operation. It comprises opposed landing gear struts 140 which diverge somewhat from their respective points of connection with the fuselage or body. These struts 140 may be of any well known construction although preferably of a construction best illustrated in Fig. 1; *i. e.* of a more or less conventional V-form when viewed from the side. The landing gear wheels 143, of which there are preferably two, are located in much the usual manner adjacent to the struts 140. They may or may not be streamlined as indicated at 143'. The landing gear axle 147 is also of a more or less standard construction in that it is extended at its ends beyond the strut ends to support the respective wheels 143. The connection between struts 140 and axle 142 comprises in addition to a number of shock absorber elastics 145 a particular and improved type of saddle. A sleeve 146 is welded or otherwise permanently fastened to the axle 142 at the foot of each strut 140. It is terminally flanged as at 146' and 146" to abut respectively the adjacent wheel 143 and a flange or collar 147 likewise welded or otherwise permanently secured to the axle.

In addition to the elastics 145 the shock absorber mechanism includes a tree 144 over the arms of which the elastics 145 are laced. The elastics 145 also engage with a corresponding number of arms carried by and located between the legs of the struts 140. In other words, shock absorbers of the tier type are provided respectively at the foot of each strut to limit and at the same time resist vertical displacement of the axle. The details of the shock absorber will be found in Patent No. 1,246,021, issued Nov. 6, 1917; the landing gear of this invention being an improvement upon the landing gear therein disclosed. Although such an arrangement of shock absorber elastics is preferred it is not to be understood that any particular arrangement of elastics is necessary as the landing gear is equally as well operative regardless of the arrangement and character of the shock absorber mechanism used.

In so far as disclosed the landing gear is of the well known or more or less conventional type. The improvement consists in so fastening the struts 140 that lateral displacement of the landing gear is permitted. The struts 140 are pivoted as at 149, the pivot axes extending longitudinally of the machine. In addition to pivotally fastening the struts 140 extra heavy brace wires 150 are provided and cross arranged in the usual manner. These wires extend from the respective pivot points 149 to points at or near the remote ends of the axle 142 where they are connected; anchorages 148 for the wires being provided. The wires are made extra heavy as they are designed to act as means for limiting the lateral displacement of the axle.

In operation, and as indicated in Fig. 2, should the machine alight on a hill side or upon uneven ground, one of the wheels (the one coming in contact with the ground first) will be vertically displaced to a greater extent than the other. Heretofore such a contingency, in view of the rigidity of the landing gear caused the fuselage or body of the craft to assume a position other than horizontal according to the character or unevenness of the ground. Under existing conditions or where the landing gear of this invention is used the laterally directed shocks are taken up and absorbed by the landing gear. Should the machine alight upon uneven ground the whole landing gear would be displaced in a manner indicated by the dotted lines in Fig. 2. The struts 140 would swing laterally about their axes 149. The wire 150 connecting with the high side of the landing gear would also swing about its point of connection remote from the high side of the landing gear. In fact, the wire 150 connecting with the high side of the landing gear would bear substantially the total impact of side thrust due to the improper or required landing. The elastics upon the high side of the landing gear would yield and permit the axle 142 to be vertically displaced and at the same time laterally displaced to an extent determined by an arcuate line described from the point of connection of said wire 150 with the fuselage. The other wire 150, or the wire connecting with the low side of the landing gear at its lower end would simultaneously slacken as the displacement of the landing gear to the right would bring the points of connection for the said wire closer together so long as one side of the landing gear were disproportionately raised.

The above construction, while simple and seemingly obvious is a big step in the advancement of the art. It permits of the complete absorption of laterally directed shocks as well as vertically directed shocks without increasing the landing gear parts or increasing the flight resistant surface of the heretofore more or less conventional V-type landing gear. The elastics take up the entire vertical shock and the wires the lateral shock. It is for this reason that the wires 150 are made extra heavy. They alone limit the lateral displacement of the landing gear according to the direction of impact. Moreover, by fastening the wires 150 directly to the axle as indicated in Fig. 2 and rigidly attaching the sleeves 146 thereto, the use of a cross brace in connection with the axle becomes unnecessary as the axle itself takes up the compression stress and serves as a rigid connection between the opposed struts 140 and wheels 143.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. In an airplane landing gear, landing gear struts having fixed longitudinally extending pivot axes, an axle movable both vertically and axially in response to laterally directed shocks, landing devices carried by the axle, an elastic connection between the axle and landing gear struts mounted at the foot of the struts to yieldingly resist vertical displacement of the axle, and means confined to the space between the struts for limiting the lateral displacement thereof.

2. In an airplane landing gear, landing gear struts having fixed longitudinally extending pivot axes, an axle movable both vertically and axially in response to laterally directed shocks, landing devices carried by the axle, elastic means mounted at the foot of the struts to yieldingly resist both vertical and axial displacement of the axle, and inelastic means confined to the space between the struts for limiting the axial displacement of the axle.

3. In an airplane landing gear, movable landing gear struts having fixed pivot axes, an axle movable vertically with respect to the struts and axially simultaneously with them, elastic means mounted at the foot of the struts to yieldingly resist vertical displacement of the axle, and wires cross arranged between the struts to limit the axial displacement of the axle.

4. In an airplane landing gear, downwardly divergent landing gear struts having fixed longitudinally extending pivot axes, an axle movable both axially and vertically in response to laterally directed shocks, landing devices carried by said axle, and elastic means mounted at the foot of the struts to yieldingly resist vertical displacement of the axle, said elastic means together with wires cross arranged between the struts respectively yieldingly resisting and limiting the axial displacement thereof.

5. An airplane landing gear, comprising a single pair of downwardly divergent landing gear struts, an axle movable both vertically and axially in response to laterally directed shocks, landing devices carried by said axle, elastic means mounted at the foot of the struts to yieldingly resist both vertical and axial displacement of said axle, and means for extending transversely across the landing gear above the axle to limit the lateral displacement of the struts and the axial displacement of the axle.

6. In an airplane landing gear, a pair of connected landing gear struts having longitudinally extending fixed pivot axes, said pair of connected struts constituting the only struts of the landing gear, an axle movable vertically in response to vertically directed shocks and vertically and axially in response to laterally directed shocks, landing devices carried by said axle, means mounted at the foot of the landing gear struts to yieldingly resist both vertical and axial displacement of the axle, and means in addition to the elastic means to limit the axial displacement of the axle, the wires being cross arranged between the struts and adapted to either flex or tighten according to the direction of displacement of the struts.

7. In an airplane landing gear, simultaneously movable connected landing gear struts having fixed longitudinally extending pivot axes, an axle movable vertically relatively to the struts in response to vertically directed shocks and vertically and axially relatively to the struts in response to laterally directed shocks, landing devices carried by said axle, an elastic connection between the axle and the landing gear struts mounted at the foot of the landing gear struts to yieldingly resist vertical displacement of the axle, and wires forming with said elastic means the only means for yieldingly resisting and limiting the axial displacement of the axle.

8. In an airplane landing gear, a pair of connected landing gear struts having fixed longitudinally extending pivot axes, the pair of struts constituting the only struts of the landing gear, an axle movable both axially and vertically in response to laterally directed shocks, landing devices carried by said axle, elastic means grouped at the foot of each landing gear strut to yieldingly resist vertical displacement of the axle, and brace wires crossed between the struts in substantially the transverse vertical plane thereof to limit the displacement of the axle.

9. The combination, in an airplane landing gear, of a pair of pivoted downwardly divergent landing gear struts, an axle extended across the foot of the struts, shock absorber means connecting the axle and struts to yieldingly resist both vertical and lateral displacement of the axle, and wires cross arranged between the struts to limit lateral displacement thereof and axial displacement of the axle, the cross arranged wires and the one pair of pivoted struts constituting the only strut and wire connections of the landing gear.

In testimony whereof I hereunto affix my signature.

HENRY KLECKLER.